United States Patent Office 3,515,767
Patented June 2, 1970

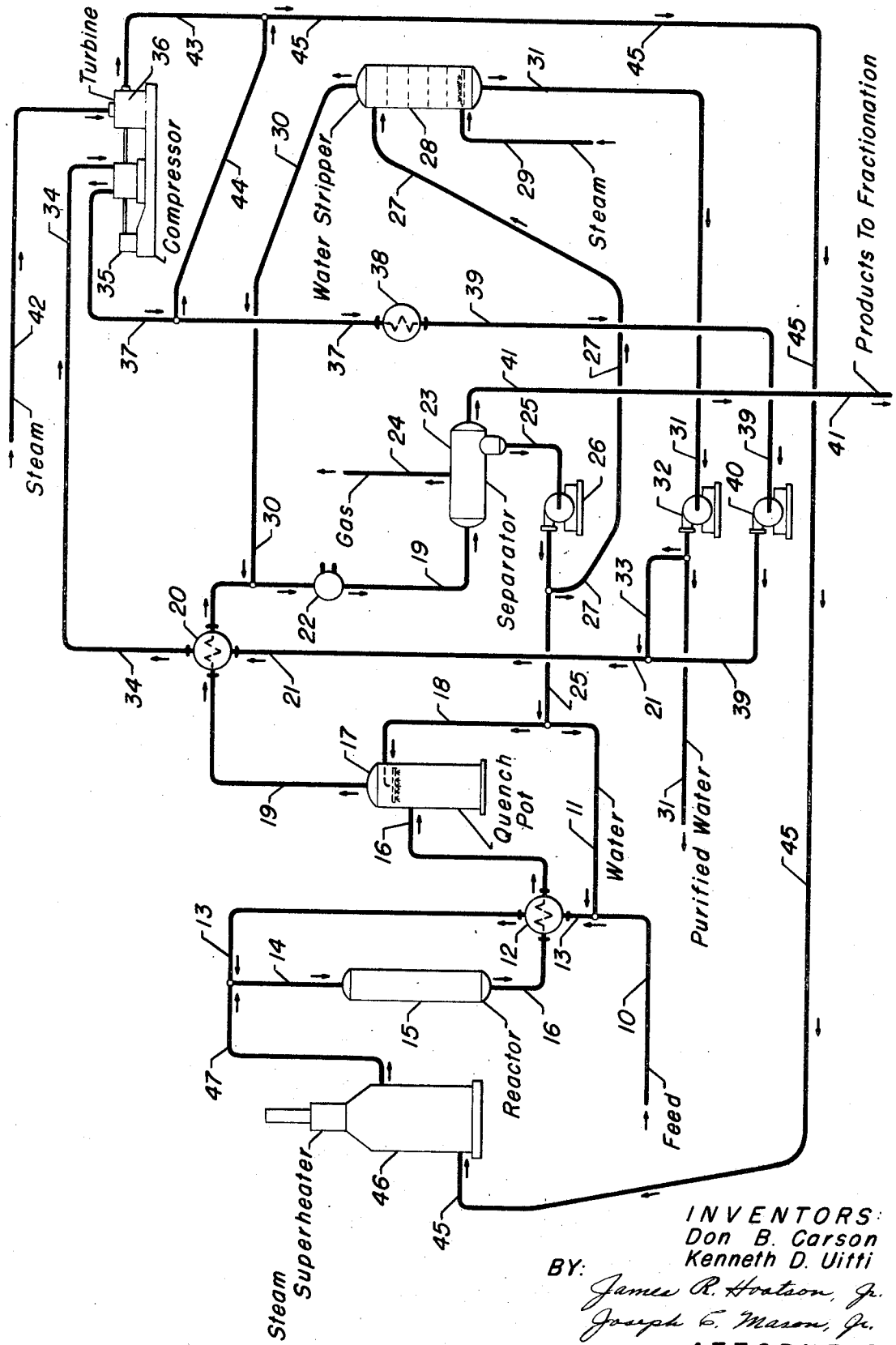

3,515,767
CATALYTIC CONVERSION PROCESS
Don B. Carson, Mount Prospect, and Kenneth D. Uitti, Bensenville, Ill., assignors to Universal Oil Products Company, Des Plaines, Ill., a corporation of Delaware
Filed May 21, 1968, Ser. No. 730,824
Int. Cl. C07c 15/10
U.S. Cl. 260—669                                    7 Claims

ABSTRACT OF THE DISCLOSURE

Process for converting hydrocarbons, such as ethylbenzene to styrene, wherein subatmospheric pressure steam is generated from the heat of quenched reaction zone effluent. The resulting low pressure steam is compressed and utilized, for example, as reboiler heat in the product recovery fractionation facilities, as well as for reactor diluent steam.

BACKGROUND OF THE INVENTION

This invention relates to the endothermic catalytic conversion of hydrocarbons. It particularly relates to an improved process for the dehydrogenation of ethylbenzene to styrene. More specifically, this invention relates to a more economic catalytic method for obtaining styrene through the "steam dehydrogenation" of ethylbenzene.

Basic methods are well known in the art for producing styrene from ethylbenzene. However, the prior art methods have generally achieved poor conversions of ethylbenzene to styrene per pass through the catalytic system. Typically, the prior art processes achieved a conversion of about 30% to 40%. The recovery of styrene in high concentration from such a prior art process requires extensive distillation apparatus in order to separate the styrene from the unreacted ethylbenzene and other reaction products. Usually, the ethylbenzene is recycled in large quantities, thereby also necessitating increased sizing of reactor vessels and the fractionators. In short, when the conversion of ethylbenzene to styrene is in the 30% range only, it is extremely difficult to produce styrene economically in high concentration and high purity.

Those skilled in the art recognize the importance of being able to produce styrene economically since this chemical is extensively employed throughout commerce as a raw material for the production of resins, plastics, elastomers and rubber for tires. Specifically, styrene is copolymerized with butadiene to produce high molecular weight synthetic rubber. Although styrene may be recovered in extremely limited quantities from various coal tars and crude oils, it is preferred to synthesize large quantities by the dehydrogenation of ethylbenzene. The raw material, ethylbenzene, can either be separated from petroleum fractions by super-distillation or can be synthetically prepared, such as through the alkylation of benzene with ethylene or ethanol.

The prior art methods for producing styrene are generally carried out by passing a mixture of ethylbenzene and steam over a fixed bed of dehydrogenation catalyst. In order to heat the reactants to the reaction temperature, it is also general practice to admix the ethylbenzene which is at a temperature significantly below reaction temperature with steam which has been superheated to a temperature above the reaction temperature so that the admixture is at reaction temperature as it passes over the dehydrogenation catalyst. Since the basic chemical reaction involved, namely the dehydrogenation of ethylbenzene to styrene is endothermic, there is a significant decrease in the reaction zone temperature as the reaction proceeds. It is not unusual in these prior art processes to witness a decrease of perhaps 50° F. to 150° F. within the reaction zone or through a particular catalyst bed. Naturally, since the reaction velocity constantly increases with temperature, then as the temperature decreases the rapidity and efficiency of the reaction also decreases so that the overall efficiency of the process declines to a point where it would be economically unattractive unless processing schemes were found to overcome this disadvantage.

Again, the prior art has attempted to solve this problem by drastically increasing the temperature of the superheated steam so that the difference between the inlet temperature of the reactants and the outlet temperature of the reaction products averaged, generally, the required high reaction temperature. However, it was noted that at the instant the superheated steam is admixed with ethylbenzene, the ethylbenzene undergoes thermal decomposition or cracking. In many instances, such pyrolysis is effected to such a degree that the process becomes uneconomical due to the loss of ethylbenzene to methane, ethane, ethylene, benzene, toluene, carbon monoxide, carbon dioxide, polymeric materials and tars. Another disadvantage involved in this dehydrogenation process is the cost of fuel in raising the temperature of large quantities of steam to a level far above that required for effecting the dehydrogenation of ethylbenzene and then subsequently wasting this large amount of heat at a low temperature by condensing the steam and hydrocarbon to liquids and then removing the condensate from the process area. Thus, it would be desirable to develop a method for utilizing this residual heat source thereby further improving the economics for producing styrene.

SUMMARY OF THE INVENTION

Accordingly, it is an object of this invention to effect a more economic method for dehydrogenating ethylbenzene to produce styrene in high concentration.

It is also an object of this invention to provide a process for the endothermic catalytic conversion of hydrocarbons in the presence of steam whereby the low grade heat available in the effluent stream is productively utilized.

It is another object of this invention to provide a process for the dehydrogenation of ethylbenzene to styrene characterized by a high conversion per pass of ethylbenzene to styrene.

In accordance with the present invention, a process for the endothermic catalytic conversion of hydrocarbons in a conversion zone comprises passing hydrocarbons to be converted into said zone under conversion conditions including the presence of hereinafter specified steam; removing from said zone a total effluent stream comprising converted hydrocarbons, unconverted hydrocarbons, and steam; quenching said effluent with an aqueous stream; passing the quenched effluent into indirect heat exchange with water, thereby generating steam at subatmospheric pressure from the water and thereby cooling said quenched effluent; recovering converted hydrocarbons from said cooled effluent utilizing a plurality of fractionation means; introducing the generated steam into compressing means driven by high pressure steam motive power under conditions sufficient to increase the pressure thereof to produce steam at superatmospheric pressure and a temperature of at least 250° F.; introducing a portion of the compressed steam to at least one of said fractionation means as reboiler heat therein; passing high pressure steam into the driver of said compressing means; exhausting steam from said driver at substantially said superatmospheric pressure; admixing the remaining portion of said compressed steam and said exhaust steam; and, passing said admixture to said conversion zone as the specified steam therein.

Another embodiment of this invention includes the process hereinabove wherein said admixture is superheated prior to introduction into said conversion zone.

A particular embodiment of this invention includes the process hereinabove wherein said conversion comprises the dehydrogenation of ethylbenzene to styrene.

Therefore, the essence of the present invention is the utilization of low grade-temperature steam (heat which must be taken out of the process) as a means of providing among other things, reboiler heat for the product recovery fractionation facilities. In addition, the present invention reduces the amount of water which must be introduced from external sources for steam generation by maximizing the amount of purified water which can be utilized in steam generators for production of the process steam required in the system with result in savings in the cost of boiler feed water treatment. Further, in many prior styrene plants, the practice has been to discard these great volumes of water into rivers and lakes. The pollution hazard is very great, because of the quantity of dissolved hydrocarbons, mainly styrene and ethylbenzene present in this water. Practice of the present invention keeps these waters within the plant and never puts such contaminated waters or pollutants into the rivers and lakes.

The advantages of the inventive process will be more clearly understood with reference to the attached drawing which is a schematic representation of the process flow illustrating the preferred embodiment of the invention.

DESCRIPTION OF THE DRAWING

With reference now to the attached drawing, ethylbenzene enters the process through line 10 being also admixed with recycle ethylbenzene from means not shown. Typically, the ethylbenzene stream is at a temperature of about 100° F. Steam condensate from line 11 is admixed with the ethylbenzene from line 10 and this admixture passes via line 13 into effluent feed exchanger 12 wherein heat is picked up for economy purposes. Additionally, in order to provide sufficient heat for reaction, superheated steam (from a source hereinafter specified) is added to the feed stream from line 47 and the total admixture of ethylbenzene and steam is passed into catalytic reaction zone 15 via line 14.

Reacton zone 15 comprises, for example, three fixed beds (not shown) of catalyst for effecting the dehydrogenation reaction. The catalyst employed is preferably an alkali-promoted iron catalyst. Typically, such a catalyst may consist of 85% by weight ferrous oxide, 2% by weight chromia, 12% by weight of potassium hydroxide, and 1% by weight of sodium hydroxide. Other catalyst compositions include 90% by weight iron oxide, 4% by weight chromia, and 6% by weight potassium carbonate. While these known commercial dehydrogenation catalysts are preferred, other known catalysts may be used, including those comprising ferrous oxide-potassium oxide, other metal oxides and/or sulfides, including those of calcium, lithium, strontium, magnesium, beryllium, zirconium, tungsten, molybdenum, titanium, hafnium, vanadium, aluminum, chromium, copper, and mixtures of two or more of the above, including chromia-alumina, alumina-titania, alumina-vanadia, etc. Similarly, the various methods of preparing the aforesaid catalysts are well known within the prior art.

The reactants enter the catalyst bed within reactor 15 at a temperature from 1000° F. to 1400° F., typically, at a temperature of about 1125° F. sufficient to convert ethylbenzene to styrene. The conditions in the, for example, first catalyst bed include not only the catalyst and temperatures as described above, but also include the weight hourly space velocity. The space velocity as used herein is defined as pounds of ethylbenzene charged per hour per pound of catalyst disposed in reactor 15. Typically, the weight hourly space velocity is within the range of about 0.1 to about 2.0, and, preferably within the range from about 0.2 to 1.5. The space velocity at any given time is correlated with a selected inlet temperature to result in a reactor product effluent having a temperature within the range of about 1000° F. to 1400° F., typically, 1065° F.

The amount of catalyst contained in each catalyst bed may be varied considerably. Typically, the bed depth may be in the range from two feet to six feet, the lower range being preferred to minimize pressure drop.

The reactor pressure may also be varied over a considerable range as long as sufficient diluting steam or heating gas is present to hold the partial pressure of the hydrocarbons at a low level, e.g. below atmospheric pressure. Sufficient pressure must be maintained at the reactor inlet to overcome the pressure drop through the multiple beds of catalyst contained in the reactor vessels or in separate vessels if each such bed is contained in a separate reactor. Either multiple beds contained in a single reactor or single beds in multiple reactors or mixtures of these arrangements may be used in the practice of this invention.

As the reactants contact the catalyst contained in the first catalyst bed of reactor 15, there is a temperature decrease observed across the catalyst bed due to the endothermic nature of the reaction. Accordingly, it is usual practice to introduce additional superheated steam into the effluent from the first catalyst bed in order to reheat the effluent for passage through the next catalyst bed. This procedure is typically repeated with as many catalyst beds as are desired in order to obtain a high conversion of, for example, ethylbenzene to styrene.

In any event, the total effluent from reactor 15 comprises a mixture of ethylbenzene, styrene, and steam. This total effluent is withdrawn via line 16 at a temperature of, say 1065° F. and passed into exchanger 12 for preheating the feed materials as previously discussed hereinabove. The total effluent stream leaving exchanger 12 is now at a temperature of about 450° F. and is passed into quench pot 17 wherein water from line 18 and a source hereinafter specified is injected directly into admixture with the total effluent stream.

The quenched effluent at a temperature of about 220° F. is withdrawn from quench pot 17 via line 19 and passed into steam generator 20 which may be of the shell and tube kettle type. Sufficient heat is released in generator 20 for the production of subatmospheric pressure steam in line 34. The steam produced will be at a temperature of from 180° F. to 220° F., typically 200° F., and may have a pressure ranging from 6 to 18 p.s.i.a., typically, 11.5 p.s.i.a. for this example.

The cooled effluent is removed from the steam generator 20 via line 19, further cooled in water cooler 22, and passed into separation zone 23. Sufficient conditions are maintained in separator 23 to remove vent gases comprising to a large extent hydrogen gas via line 24, a steam condensate fraction which is removed via line 25, and a hydrocarbon fraction comprising primarily styrene and ethylbenzene which is removed via line 41 and sent to fractionation recovery facilities, not shown.

The steam condensate in line 25 is passed through pump 26 and separated into at least two sections. A first section continues in line 25 and is further separated with one portion being passed via line 18 into quench pot 17 and another portion being passed via line 11 into line 13 both as previously described hereinabove.

The other portion of steam condensate is passed via line 27 into water stripper tower 28 wherein additional steam is injected via line 29 in order to strip out contaminating hydrocarbon from the contaminated steam condensate. These hydrocarbon fractions are obtained overhead and sent via line 30 as a recycle stream to separator 23 in admixture with the cooled effluent in line 19.

The purified water free of hydrocarbons and polymers of styrene now suitable for reuse in a steam generator, is withdrawn via line 31 and passed via pump 32 at least in part via line 33 and line 21 to steam generator 20 for the conversion therein to subatmospheric pressure steam as previously described. Another portion of the purified water is removed from the system via line 31 and preferably sent to other high pressure steam generators.

Returning now to steam generator 20, the subatmospheric pressure steam in line 34 is now passed into compressor 35 which is driven by turbine drive 36 using relatively high pressure steam which is introduced into the system via line 42. It is within the concept of the present invention that the purified water in line 31 be converted into the high pressure steam which is utilized in line 42 by conventional means not shown. The compressed steam from compressor 35 at a pressure of from 20 to 50 p.s.i.a. typically, 30 p.s.i.a., and a temperature of at least 230° F. is withdrawn via line 37 and passed into fractionator column reboilers 38 having associated therewith the product recovery fractionating columns (not shown) to which the hydrocarbon products in line 41 were sent as previously discussed. Having given up heat in the fractionator reboilers, the steam has been condensed to condensate and is withdrawn via line 39 and passed through pump 40 into admixture with the steam condensate from line 33 thereby forming the total steam condensate which is passed via line 21 back to steam generator 20 for the conversion therein of sub-atmospheric pressure steam.

The relatively high pressure steam, e.g. 600 p.s.i.g., which was introduced into turbine drive 36 via line 42 is exhausted via line 43 at a pressure which is substantially the same as the pressure in discharge line 37. Therefore, if desired, a portion of the compressed steam in line 37 may be sent via line 44 for admixture with the exhaust steam in line 43. This admixture of relatively low pressure steam is now passed via line 45 into steam superheater 46 and the superheated steam being passed into admixture with the incoming feed materials via line 47 as previously discussed.

It was found that by operating in the manner described hereinabove that significant savings in utility costs (steam primarily) could be realized. For example, if the prior art steam costs were $100, the steam cost for the practices of the present invention would be about $33. This provides those skilled in the art with an idea of the magnitude of economies which can be achieved through the practice of the present invention.

Usually, the amount of steam used in admixture with the feed for the dehydrogenation of ethylbenzene to styrene may vary from about 1 pound per pound to about 20 pounds of steam per pound of total ethylbenzene feed. Typically, the amount of steam and ethylbenzene are in proportion of about 2.8 pounds of steam per pound of total ethylbenzene.

Although the present invention has been described with reference to the appended drawing to the reaction for the dehydrogenation of ethylbenzene to styrene, it is to be noted that the process of the present invention is equally applicable broadly to the endothermic catalytic conversion of hydrocarbons. It is particularly applicable, however, to the dehydrogenation of alkylated aromatic hydrocarbons, such as ethylbenzene, isopropylbenzene, diethylbenzene, ethylnaphthalene, ethylchlorobenzene, etc.

While the invention was described utilizing a reactor having three catalyst beds disposed therein, it will be realized that it is not critical as to the number of such catalyst beds. However, it is preferably to employ at least three (3) catalyst beds and in some instances as many as five (5) or more catalyst beds may be used to advantage.

The benefits to be gained by the practice of this invention are predicated on the fact that the dew point of the reaction zone effluent mixture at relatively low pressures (e.g. atmospheric) is from, say 215° F. to 230° F. Further, the major amount of heat to be recovered is between this temperature, e.g. 220° F., and the condensing temperature of, say 100° F. On the other hand, the amount of heat available for recovery between, say 210° F. and 450° F. is not significant enough to warrant efforts in recovery.

PREFERRED EMBODIMENT

Therefore, according to the teachings presented hereinabove, a preferred embodiment of the present invention provides a process for producing styrene via the catalytic dehydrogenation of ethylbenzene in a multi-bed reaction zone which comprises the steps of: (a) admixing ethylbenzene and steam condensate and passing said mixture into the reaction zone under conditions including the presence of hereinafter specified superheated steam sufficient to convert ethylbenzene to styrene; (b) removing from said zone a total effluent stream comprising unreacted ethylbenzene, styrene, gaseous hydrocarbons, and steam; (c) quenching said effluent by direct contact with an aqueous stream; (d) passing the quenched effluent into indirect heat exchange with hereinafter specified steam condensate under conditions sufficient to generate subatmospheric pressure steam from said condensate and to substantially cool said effluent; (e) introducing the cooled effluent into a separation zone to produce a hydrocarbon fraction comprising ethylbenzene and styrene and an aqueous fraction contaminated with hydrocarbons; (f) returning a portion of said aqueous fraction of step (e) to step (c) as at least part of said aqueous stream specified; (g) introducing the remainer of said aqueous fraction of step (e) into a stripping zone under conditions sufficient to produce an overhead fraction comprising hydrocarbons and a bottoms fraction comprising steam condensate; (h) returning at least a portion of said steam condensate of step (g) to step (d) as part of said specified condensate; (i) recovering styrene from said hydrocarbon fraction of step (e) by fractionation in a fractionation zone; (j) introducing the generated steam of step (d) into compressing means driven by relatively high pressure steam motive power to increase the pressure thereof to produce steam at superatmospheric pressure and a temperature of at least 250° F., and exhausting the high pressure steam at a pressure substantially the same as said superatmospheric pressure; (k) passing at least a portion of said compressed steam into said fractionation zone as reboiler heat therein, thereby condensing said steam; (l) returning the steam condensate of step (k) to step (d) as the remaining part of said specified condensate; (m) admixing the remaining portion of said compressed steam and said exhaust steam; and (n) passing said admixture into superheating means and introducing the superheated steam into the reaction zone of step (a) as said specified steam.

The invention claimed is:

1. Process for the endothermic catalytic conversion of hydrocarbons in a conversion zone which comprises passing hydrocarbons to be converted into said zone under conversion conditions including the presence of hereinafter specified steam; removing from said zone a total effluent stream comprising converted hydrocarbons, unconverted hydrocarbons, and steam; quenching said effluent with an aqueous stream; passing the quenched effluent into indirect heat exchange with water thereby generating steam at subatmospheric pressure from the water and thereby cooling said quenched effluent; recovering converted hydrocarbons from said cooled effluent utilizing a plurality of fractionation means; introducing the generated steam into compressing means driven by high pressure steam motive power under conditions sufficient to increase the pressure thereof to produce steam at superatmospheric pressure and a temperature of at least 250° F.; introducing a portion of the compressed steam to at least one of said fractionation means as reboiler heat therein; passing high pressure steam into the driver of said compressing means; exhausting steam from said driver at substantially said superatmospheric pressure; admixing the remaining portion of said compressed steam and said exhaust steam; and, passing said admixture to said conversion zone as the specified steam therein.

2. Process according to claim 1 wherein said admixture is superheated prior to introduction into said conversion zone.

3. Process according to claim 2 wherein said conversion is the dehydrogenation of alkylaromatic hydrocarbons.

4. Process according to claim 3 wherein said alkylaromatic hydrocarbons comprise ethylbenzene and the recovered converted hydrocarbons comprise styrene.

5. Process according to claim 1 wherein said subatmospheric pressure is from 10 to 12 p.s.i.a.

6. Process for producing styrene via the catalytic dehydrogenation of ethylbenzene in a multi-bed reaction zone which comprises the steps of:
  (a) admixing ethylbenzene and steam condensate and passing said admixture into the reaction zone under conditions including the presence of hereinafter specified superheated steam sufficient to convert ethylbenzene to styrene;
  (b) removing from said zone a total effluent stream comprising unreacted ethylbenzene, styrene, gaseous hydrocarbons, and steam;
  (c) quenching said effluent by direct contact with an aqueous stream;
  (d) passing the quenched effluent into indirect heat exchange with hereinafter specified steam condensate under conditions sufficient to generate subatmospheric pressure steam from said condensate, and to substantially cool said effluent;
  (e) introducing the cooled effluent into a separation zone to produce a hydrocarbon fraction comprising ethylbenzene and styrene and an aqueous fraction contaminated with hydrocarbons;
  (f) returning a portion of said aqueous fraction of step (e) to step (c) as at least part of said aqueous stream specified;
  (g) introducing the remainder of said aqueous fraction of step (e) into a stripping zone under conditions sufficient to produce an overhead fraction comprising hydrocarbons and a bottoms fraction comprising steam condensate;
  (h) returning at least a portion of said steam condensate of step (g) to step (d) as part of said specified condensate;
  (i) recovering styrene from said hydrocarbon fraction of step (e) by fractionation in a fractionation zone;
  (j) introducing the generated steam of step (d) into compressing means driven by relatively high pressure steam motive power to increase the pressure thereof to produce steam at superatmospheric pressure and a temperature of at least 250° F., and exhausting the high pressure steam at a pressure substantially the same as said superatmospheric pressure;
  (k) passing at least a portion of said compressed steam into said fractionation zone as reboiler heat therein, thereby condensing said steam;
  (l) returning the steam condensate of step (k) to step (d) as the remaining part of said specified condensate;
  (m) admixing the remaining portion of said compressed steam and said exhaust steam; and
  (n) passing said admixture into superheating means and introducing the superheated steam into the reaction zone of step (a) as said specified steam.

7. Process according to claim 6 wherein said subatmospheric pressure is from 10 to 12 p.s.i.a. and said superatmospheric pressure from 30 to 50 p.s.i.a.

References Cited
UNITED STATES PATENTS

| | | | |
|---|---|---|---|
| 3,256,355 | 6/1966 | Gilman et al. | 260—669 |
| 3,294,856 | 12/1966 | Huckins | 260—669 |

DELBERT E. GANTZ, Primary Examiner

C. R. DAVIS, Assistant Examiner